Figure 1:
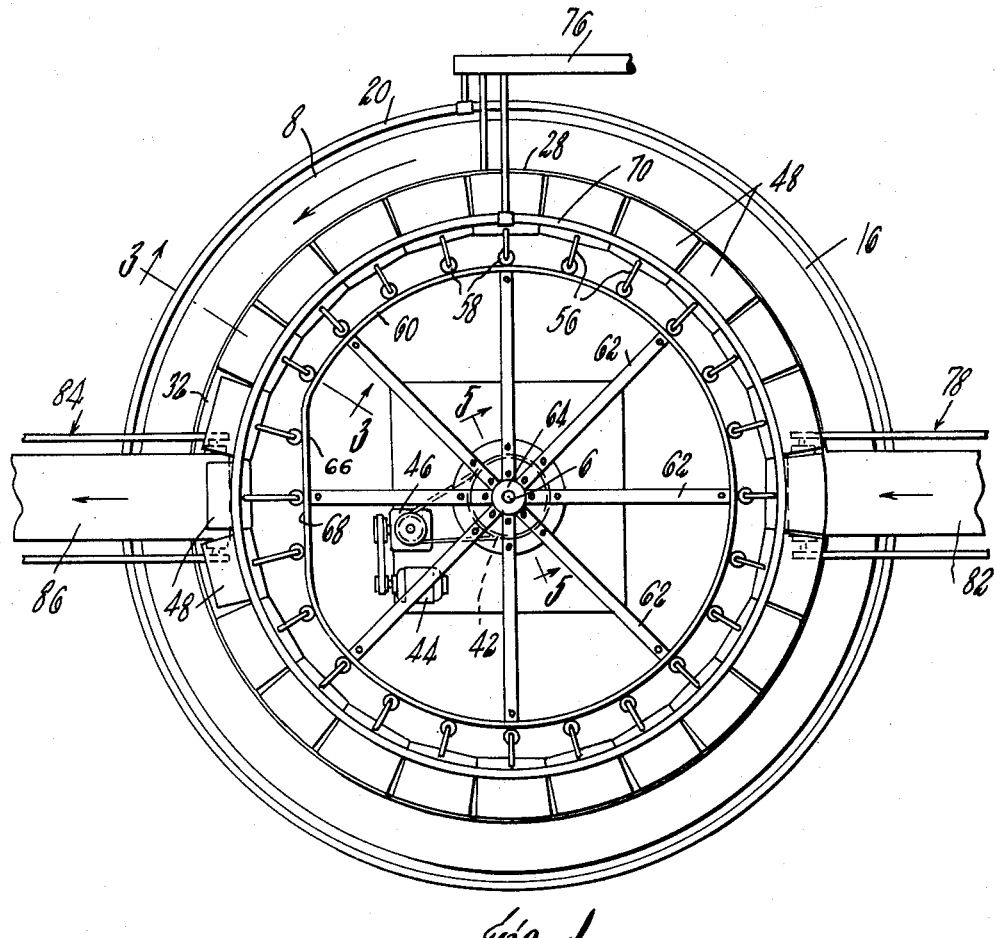

Sept. 29, 1964  H. BARRETT  3,150,775

MATERIAL HANDLING APPARATUS

Filed May 16, 1963  2 Sheets-Sheet 1

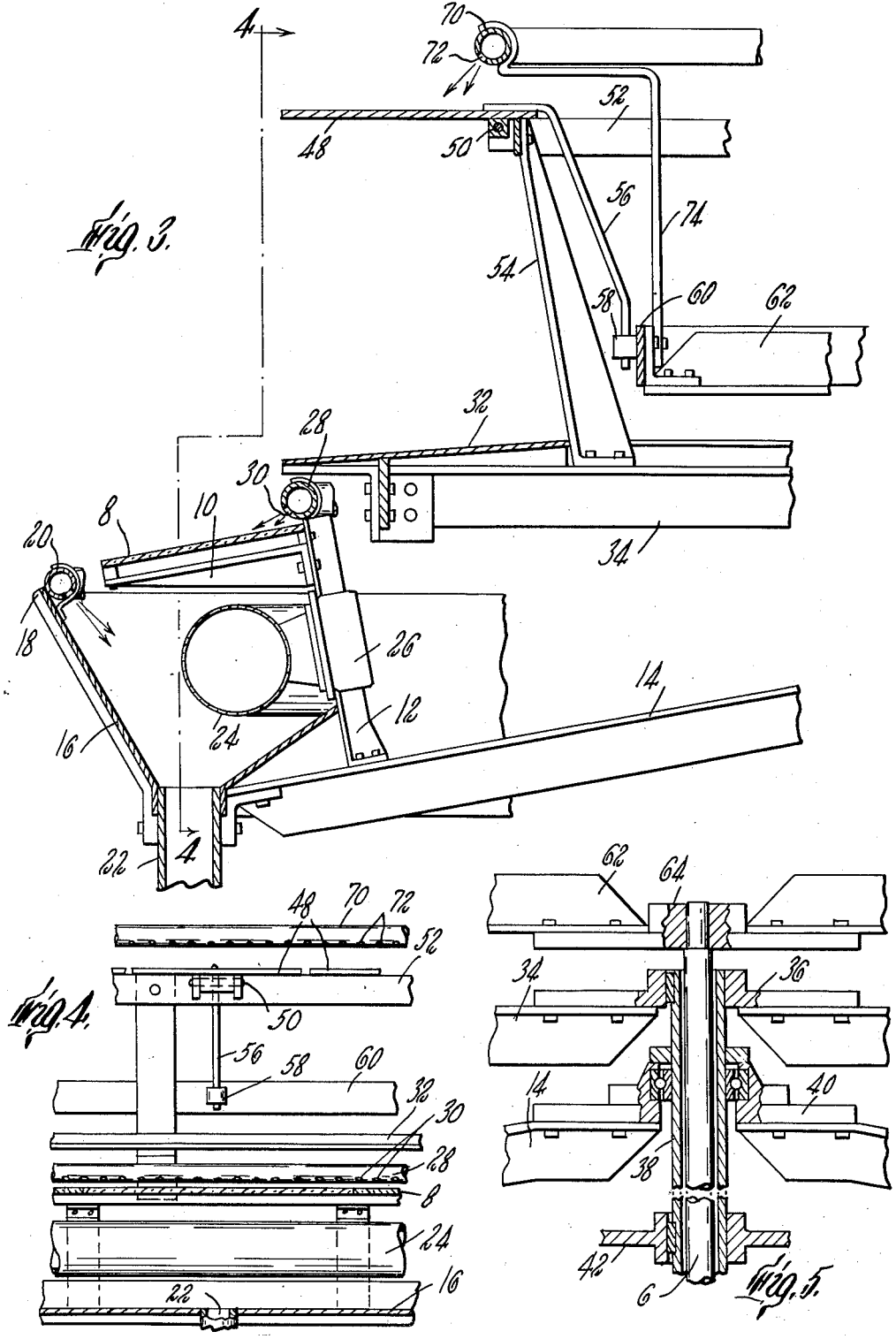

United States Patent Office 3,150,775
Patented Sept. 29, 1964

3,150,775
MATERIAL HANDLING APPARATUS
Laverne H. Barrett, Gloucester, Mass., assignor to Gorton's of Gloucester, Inc., Gloucester, Mass., a corporation of Massachusetts
Filed May 16, 1963, Ser. No. 280,963
16 Claims. (Cl. 209—124)

The present invention relates to material handling apparatus and more particularly to such apparatus useful in the hand processing of fish or fish parts, such as fish fillets.

While the invention is of general use in the handling of individual work pieces which must be moved from a supply position to a work station at which they are operated upon by an operator, taken away from the work station when finished and delivered to a discharge point, the invention has been developed particularly for use in the hand processing or "candling" of fish fillets and accordingly the present disclosure will be made by reference particularly to this use of the machine.

Fish fillets are prepared for retail sale by first cutting them from the fish to provide what will be termed herein a rough fillet. The rough fillets must be inspected or "candled," and trimmed, if necessary, to remove bones or other undesired parts, before they can be packaged for sale to the consumer. These operations are performed by hand, individually on each fillet.

Heretofore such hand operations on the fish fillets have been time-consuming, partly at least because of the inefficient equipment available for supplying the rough fillets to the operators and carrying the processed fillets away from the operators. On practice used heretofore has involved feeding the rough fillets on to one end of a straight-line conveyor belt which carries them past a series of work tables at the sides of the belt. Each operator takes rough fillets from the continuously moving belt and for this purpose it has been the practice for the operators to place a board with its lower edge resting on the belt and one of its faces bearing against fixed standards at the sides of the belt so that the board remains stationary and serves to collect fish at the particular operator's work station. Continuous movement of the belt under the stationary fish rapidly wears away the fish. Also, when a board is in place at one station, operators downstream from that station are not receiving rough fillets, wth the result that their time may be wasted. Such apparatus as has herefore been available has been less sanitary and generally less efficient and satisfactory than could be desired.

The present invention has as one object to overcome the foregoing and other disadvantages of heretofore known fish fillet handling apparatus.

A further object of the invention is to provide an efficient apparatus for use in the hand processing of work pieces which will receive work pieces from a supply, efficiently deliver them to a series of separate work stations, receive the completed work pieces from the operators at the work stations and deliver them to a single discharge point for discharge from the apparatus.

Figure 2:
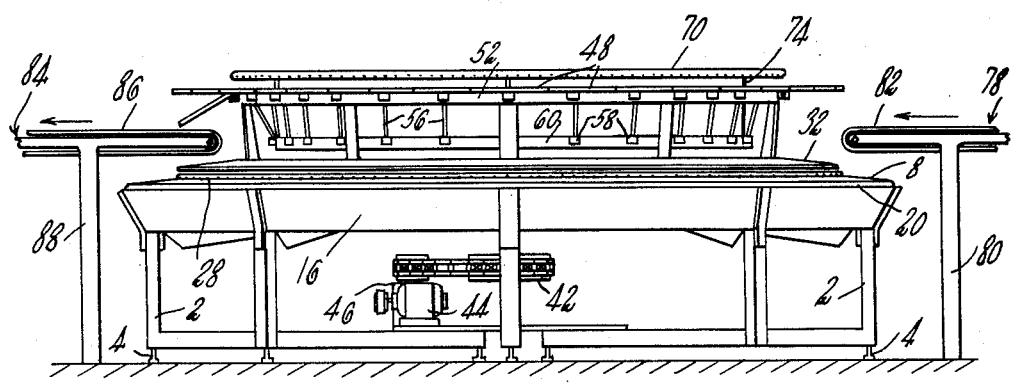

Other objects, features and advantages of the invention will become apparent from the following description of a presently preferred embodiment of the invention, in which description reference is made to the accompanying drawing, wherein FIG. 1 is a plan view of the apparatus;
FIG. 2 is a side elevation;
FIG. 3 is an enlarged vertical sectional view on line 3—3 of FIG. 1;
FIG. 4 is a detail vertical sectional view on line 4—4 of FIG. 3, to a reduced scale, and,
FIG. 5 is an enlarged vertical sectional view, partly in elevation, and partly broken away, taken approximately on the line 5—5 of FIG. 1.

In accordance with the invention the apparatus includes a stationary annular work table on which fillets may be processed and about the outer periphery of which a number of operators may sit, a rotatable annular distributing conveyor adjacent the work table, together with means for rotating the distributing conveyor to carry rough fillets about the work table so that they can be taken from the conveyor by the operators as needed, and a rotatable take-away conveyor, also adjacent the work table, on which the operators may place the fillets when they have finished their work on them, together with means for rotating the take-away conveyor. The work table, distributing conveyor and take-away conveyor are disposed coaxially and these two conveyors rotate about the common axis. The take-away conveyor is made up of a series of platforms arranged in a circle, each being tiltable from a normal horizontal position, in which it transports the finished fillets, to an inclined position into which it is moved at a discharge station to release the finished fillets for removal from the apparatus. Conveniently the take-away conveyor may be supported on the distributing conveyor for movement therewith.

The apparatus preferably also includes an annular waste trough open at its top, coaxial with the work table and disposed below the work table, into which the operators may drop waste material, together with means for directing a spray of water or other liquid into the trough and a drain for removing liquid and waste fish parts from the trough. The work surface of the work table preferably is translucent and the table provided with a light source beneath the work surface so that the fish fillets, when placed on the work surface by the operator, can efficiently be "candled" and otherwise processed. Conveniently, a continuously moving supply conveyor is located at one point on the periphery of the distributing conveyor for feeding rough fillets to the distributing conveyor, and a discharge conveyor is arranged at a point on the periphery of the take-away conveyor to convey the completed fish fillets out of the apparatus. The apparatus desirably also includes means for directing a spray of water or other liquid continuously on to the surface of the work table and means for directing a spray of liquid on to the take-away platforms, these two sprays contributing to cleanliness of the apparatus at all times.

Referring now to the drawing, the illustrated apparatus useful in the hand processing of fish fillets comprises in general organization a main frame 2 supported on adjustable feet 4. Fixed in the main frame at the middle of its base is an upstanding stationary post 6 which provides the common axis for the rotating distributing conveyor and take-away conveyor. Coaxial with the shaft 6 is a stationary annular work table 8 supported by brackets 10 carried on a series of standards 12, which standards in turn are carried by a series of radial arms 14 extending inwardly to the post 6 and forming part of the main frame 2. The work table 8 is formed from a sheet of transparent or translucent material, for example, a synthetic plastic material.

Disposed beneath the work table 8 is an annular waste trough 16, supported on the main frame 2 and on the standards 12. The upper outer rim 18 of the trough is located slightly below and outwardly of the periphery of the work table 8 and carries an annular water spray pipe 20 arranged in position to direct a spray of water downwardly and inwardly of the trough. The spray pipe 20 is spaced outwardly from the work table 8, providing a space therebetween through which the operator may drop bones and other waste materials into the trough. The trough 16 is provided at one or more points with a drain pipe 22 for conducting water and waste material from the trough.

Disposed beneath the work table 8 is a light source, housed in a transparent protective tube 24 supported on the standards 12. At any convenient location, an electrical junction box 26 is provided for connection of the light source to a suitable power supply. The light source directs light upwardly through the transparent work surface of the work table 8 to permit candling and efficient handling of the fish by the operators.

Fixed at the top of the standards 12 is an annular water supply pipe 28 provided with suitable perforations 30 positioned to direct a spray of water downwardly and outwardly against the upper surface of the work table 8, keeping the table clean and washing any waste material off of the outer edge of the table and into the trough 16.

An annular distributing conveyor 32 is positioned with its outer edge above and adjacent the annular pipe 28. This conveyor is formed from a sheet of stainless steel and thus is sanitary and readily kept clean at all times. Rough fish fillets to be processed are carried on the surface of the conveyor 32 and as it moves about the work table 8 are readily accessible to the operators so that each operator may remove them from the conveyor as needed. The distributing conveyor 32 is rigidly connected to and supported and rotated by a plurality of radial arms 34, each connected at its inner end to a hub 36 which is supported on and splined to a hollow shaft 38 surrounding the post 6. The hollow shaft 38 is journaled for rotation in the hub 40 carried by the stationary arms 14 and carries adjacent its lower end a drive sprocket 42 by which it is rotated by electric motor 44 (FIG. 2), through a speed reduction gear 46.

Disposed above the distributing conveyor 32 is a take-away conveyor comprising a series of platforms 48 arranged in a circle. Each platform 48 is formed by a stainless steel plate and is pivotally mounted at 50 on a circular frame member 52 supported by a series of brackets 54 bolted at their lower ends on the radial arms 34. Each platform further includes a tail piece 56 secured to its inner end and inclined rearwardly and downwardly as shown in FIG. 3 and carrying at its lower end a rotatable cam follower roll 58. The cam follower rolls 58 run on a cam 60 which is generally cylindrical in shape but is provided with a fall and rise at one position, as will be described hereinafter. The cam 60 is carried on a series of radially disposed arms 62 which are fixed at their inner ends to a hub 64 which is supported on and fixed to the upper end of the stationary post 6. The cam 60 throughout the greater part of its extent holds the cam follower rolls 58 in such a position that the platforms 48 are disposed horizontally to transport finished fish fillets placed on them by the operators. At a discharge station, the cam 60 is provided with a fall 66, FIG. 1, at which point the cam is of reduced diameter, permitting the cam follower rolls 58 to move inwardly and tilt the platforms 48 downwardly to release the finished fillets therefrom. As the platforms 48 leave the discharge station, the cam follower rolls 58 run along the rise 68 of the cam and thus are moved outwardly to re-position the platforms in their normal horizontal positions, shown in FIG. 3.

Means is provided for continuously cleaning the platforms 48 by directing a spray of water against them. For this purpose, an annular pipe 70 provided with suitable spray apertures 72 is supported on a series of arms 74 fixed on the stationary radial arms 62 which support the cam 60. Suitable connections are provided to each of the pipes 70, 28 and 20 to provide water or other liquid under appropriate pressure from a supply pipe 76, FIG. 1.

At any suitable point around the periphery of the machine a supply conveyor 78 supported on standards 80 and including an endless apron 82 is provided for feeding rough fillets on to the traveling distributing conveyor 32. At the discharge station a similar discharge conveyor 84, having a moving apron 86 and supported on a standard 88, is provided to receive the finished fillets released from the platforms 48 at the discharge station and carry them away from the platforms.

It will be seen from the foregoing that a highly efficient apparatus is provided for receiving the rough fillets, distributing them among the operators so that each operator has available rough fillets to work on as needed, for conveniently receiving the finished fillets from the operator and taking them away to a common discharge station and carrying them from the apparatus at the discharge station. The distributing conveyor 32 and the take-away platforms 48, and other parts as well, can readily be fabricated from material which is highly resistant to water absorption, such as stainless steel, and therefore are easily kept clean and sanitary. The continuously operating water sprays which are directed on to the work table and the take-away conveyor contribute further to keeping these parts in clean and sanitary condition. The waste products are immediately and continuously removed from the work stations by the trough and disposed of.

I claim:

1. Material handling apparatus for use in the hand processing of individual workpieces comprising a stationary annular work table on which a workpiece may be processed, an annular waste trough below said work table, a rotatable annular distributing conveyor adjacent said work table and connected to a rotatable central vertical shaft for rotation therewith, means for rotating said distributing conveyor to carry workpieces to be processed about said work table, a rotatable take-away conveyor adjacent said work table, means for rotating said take-away conveyor, and means for removing processed workpieces from said take-away conveyor.

2. An apparatus for use in the hand processing of fish comprising a stationary annular waste trough, a stationary annular work table coaxial with said trough, a rotatable annular distributing conveyor coaxial with said trough and connected to a rotatable central vertical shaft for rotation therewith, means for rotating said distributing conveyor, a rotatable annular take-away conveyor coaxial with said trough disposed adjacent said work table, and means for rotating said take-away conveyor.

3. An apparatus for use in the hand processing of fish comprising a stationary annular waste trough open at its top, a drain for conducting liquid and waste fish parts from said trough, a stationary annular work table coaxial with said trough, a rotatable annular distributing conveyor coaxial with said trough and connected to a rotatable central vertical shaft for rotation therewith, means for rotating said distributing conveyor, a rotatable take-away conveyor coaxial with said trough disposed adjacent said work table, means for rotating said take-away conveyor, said take-away conveyor including a series of platforms arranged in a circle, each platform being tiltable from a normal horizontal position for supporting processing fish to an inclined position for releasing the processed fish, and means at a discharge station for tilting each platform as it reaches said discharge station and returning it to horizontal position as it leaves said discharge station.

4. An apparatus for use in the hand processing of fish comprising a stationary annular waste trough open at its top, a stationary annular translucent work table coaxial with said trough, a light source disposed below said work table for directing light upwardly through said work table, a rotatable annular distributing conveyor coaxial with said trough, means for rotating said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horizontal position for supporting processed fish to an inclined position for releasing the processed fish, and means at a discharge station for tilting each platform as it reaches said discharge station and returning it to horizontal position as it leaves said discharge station.

5. An apparatus for use in the hand processing of fish comprising a stationary annular waste trough open at its top, means for spraying liquid into the top of said trough, a drain for conducting liquid and waste fish parts from said trough, a stationary annular translucent work table coaxial with said trough, means for directing a spray of liquid on to said work table, a light source disposed below said work table for directing light upwardly through said work table, a rotatable annular distributing conveyor coaxial with said trough, means for rotating said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horizontal position for supporting processed fish to an inclined position for releasing the processed fish, means at a discharge station for tilting each platform as it reaches said discharge station and returning it to horizontal position as it leaves said discharge station, and means for directing a spray of liquid on to the upper surfaces of said platforms.

6. An apparatus for use in the hand processing of fish comprising a stationary annular waste trough open at its top, a stationary annular translucent work table coaxial with said trough, a light source disposed below said work table for directing light upwardly through said work table, a rotatable annular distributing conveyor coaxial with said trough, means for rotating said distributing conveyor, a supply conveyor for delivering fish to be processed to said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horiozntal position for supporting processed fish to an inclined position for releasing the processed fish, means at a discharge station for tilting each platform as it reaches said discharge station and returning it to horizontal position as it leaves said discharge station, and a discharge conveyor at said discharge station arranged and disposed to receive processed fish released from said platforms and convey them away from the platforms.

7. An apparatus for use is in the hand processing of fish comprising a stationary annular waste trough, a stationary annular translucent work table coaxial with said trough, means for directing a spray of liquid on to said work table, a light source disposed below said work table for directing light upwardly through said work table, a rotatable annular distributing conveyor coaxial with said trough means for rotating said distributing conveyor, a supply conveyor for delivering fish to be processed to said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horizontal position for supporting processed fish to an inclined position for releasing the processed fish, means at a discharge station for tilting each platform as it reaches said discharge station and returning it to horizontal position as it leaves said discharge station, means for directing a spray of liquid on to the upper surfaces of said platforms, and a discharge conveyor at said discharge station arranged and disposed to receive processed fish released from said platforms and convey them away from the platforms.

8. An apparatus for use in the hand processing of fish comprising a stationary annular waste trough open at its top, means for spraying liquid into the top of said trough, a drain for conducting liquid and waste fish parts from said trough, a stationary annular translucent work table coaxial with said trough, means for directing a spray of liquid on to said work table, a light source disposed below said work table for directing light upwardly through said work table, a rotatable annular distributing conveyor coaxial with said trough, means for rotating said distributing conveyor, a supply conveyor for delivering fish to be processed to said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horizontal position for supporting processed fish to an inclined position for releasing the processed fish, means at a discharge station for tilting each platform as it reaches said discharge station and returning it to horizontal position as it leaves said discharge station, and means for directing a spray of liquid on to the upper surfaces of said platforms.

9. An apparatus for use in the hand processing of fish comprising a stationary annular waste trough open at its top, means for spraying liquid into the top of said trough, a drain for conducting liquid and waste fish parts from said trough, a stationary annular translucent work table coaxial with said trough, means for directing a spray of liquid on to said work table, a light source disposed below said work table for directing light upwardly through said work table, a rotatable annular distributing conveyor coaxial with said trough, means for rotating said distributing conveyor, a supply conveyor for delivering fish to be processed to said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horizontal position for supporting processed fish to an inclined position for releasing the processed fish, menas at a discharge station for tilting each platform as it reaches said discharge station and returning it to horizontal position as it leaves said discharge station, and a discharge conveyor at said discharge station arranged and disposed to receive processed fish released from said platforms and convey them away from the platforms.

10. An apparatus for use in the hand processing of fish comprising a stationary annular waste trough open at its top, means for spraying liquid into the top of said trough, a drain for conducting liquid and waste fish parts from said trough, a stationary annular translucent work table coaxial with said trough, means for directing a spray of liquid on to said work table, a light source disposed below said work table for directing light upwardly through said work table, a rotatable annular distributing conveyor coaxial with said trough, means for rotating said distributing conveyor, a supply conveyor for delivering fish to be processed to said distributing conveyor, a rotatable take-away conveyor coaxial with said trough disposed adjacent said work table, means for rotating said take-away conveyor, said take-away conveyor including a series of platforms arranged in a circle, each platform being tiltable from a normal horizontal position for supporting processed fish to an inclined position for releasing the processed fish, means at a discharge station for tilting each platform as it reaches said discharge station and returning it to horizontal position as it leaves said discharge station, means for directing a spray of liquid on to the upper surfaces of said platforms, and a discharge conveyor at said discharge station arranged and disposed to receive processed fish released from said platforms and convey them away from the platforms.

11. An apparatus for use in the hand processing of fish comprising a stationary annular waste trough open at its top, means for spraying liquid into the top of said trough, a drain for conducting liquid and waste fish parts from said trough, a stationary annular translucent work table coaxial with said trough, means for directing a spray of liquid on to said work table, a light source disposed below said work table for directing light upwardly through said work table, a rotatable annular distributing conveyor coaxial with said trough, means for rotating said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horizontal position for supporting processed fish to an inclined position for releasing the processed fish, means at a discharge station for tilting each platform as it reaches said discharge station and returning it to horizontal position as it leaves said discharge station, means for directing a spray of liquid on to the upper surfaces of said platforms, and a discharge conveyor at said discharge station arranged and disposed to receive processed fish released from said platforms and convey them away from the platforms.

12. An apparatus for use in the hand processing of fish comprising a stationary annular waste trough open at its top, means for spraying liquid into the top of said trough, a drain for conducting liquid and waste fish parts from said trough, a stationary annular work table coaxial with said trough, means for directing a spray of liquid on to said work table, a rotatable annular distributing conveyor coaxial with said trough, means for rotating said distributing conveyor, a supply conveyor for delivering fish to be processed to said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horizontal position for supporting processed fish to an inclined position for releasing the processed fish, means at a discharge station for tilting each platform as it reaches said discharge station and returning it to horizontal position as it leaves said discharge station, means for directing a spray of liquid on to the upper surfaces of said platforms, and a discharge conveyor at said discharge station arranged and disposed to receive processed fish released from said platforms and convey them away from the platforms.

13. An apparatus for use in the hand processing of fish comprising a stationary annular waste trough open at its top, means for spraying liquid into the top of said trough, a drain for conducting liquid and waste fish parts from said trough, a stationary annular translucent work table coaxial with said trough, a light source disposed below said work table for directing light upwardly through said work table, a rotatable annular distributing conveyor coaxial with said trough, means for rotating said distributing conveyor, a supply conveyor for delivering fish to be processed to said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horizontal position for supporting processed fish to an inclined position for releasing the processed fish, means at a discharge station for tilting each platform as it reaches said discharge station and returning it to horizontal position as it leaves said discharge station, means for directing a spray of liquid on to the upper surfaces of said platforms, and a discharge conveyor at said discharge station arranged and disposed to receive processed fish released from said platforms and convey them away from the platforms.

14. An apparatus for use in the hand processing of fish comprising a stationary annular waste trough open at its top, means for spraying liquid into the top of said trough, a drain for conducting liquid and waste fish parts from said trough, a stationary annular translucent work table coaxial with said trough, means for directing a spray of liquid on to said work table, a light source disposed below said work table for directing light upwardly through said work table, a rotatable annular distributing conveyor coaxial with said trough, means for rotating said distributing conveyor, a supply conveyor for delivering fish to be processed to said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horizontal position for supporting processed fish to an inclined position for releasing the processed fish, means at a discharge station for tilting each platform as it reaches said discharge station and returning it to horizontal position as it leaves said discharge station, means for directing a spray of liquid on to the upper surfaces of said platforms, and a discharge conveyor at said discharge station arranged and disposed to receive processed fish released from said platforms and convey them away from the platforms.

15. An apparatus for use in the hand processing of fish comprising a stationary annular waste trough open at its top, means for spraying liquid into the top of said trough, a drain for conducting liquid and waste fish parts from said trough, a stationary annular translucent work table coaxial with said trough and at least partly overlying the open top of said trough, means for directing a spray of liquid on to said work table, a light source disposed below said work table for directing light upwardly through said work table, a rotatable annular distributing conveyor coaxial with said trough and disposed above and adjacent the inner edge of said work table, means for rotating said distributing conveyor, a supply conveyor for delivering fish to be processed to said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horizontal position for supporting processed fish to an inclined position for releasing the processed fish, means at a discharge station for tilting each platform as it reaches said discharge station and returning it to horizontal position as it leaves said discharge station, means for directing a spray of liquid on to the upper surfaces of said platforms, and a discharge conveyor at said discharge station arranged and disposed to receive processed fish released from said platforms and convey them away from the platforms.

16. Material handling apparatus comprising a stationary annular waste trough, a stationary annular work table coaxial with said trough, a rotatable annular distributing conveyor coaxial with said trough, means for rotating said distributing conveyor, a rotatable take-away conveyor coaxial with said trough disposed adjacent said work table and supported on said distributing conveyor for rotation therewith, said take-away conveyor including a series of platforms arranged in a circle, each platform being tiltable from a normal horizontal position for supporting processed work pieces to an inclined position for releasing the processed work pieces, means at a discharge station for tilting each platform as it reaches said discharge station and returning it to horizontal position as it leaves said discharge station, and a discharge conveyor at said discharge station arranged and disposed to receive processed work pieces released from said platforms and convey them away from the platforms.

References Cited in the file of this patent

UNITED STATES PATENTS

| | | |
|---|---|---|
| 692,866 | Lawrence | Feb. 11, 1902 |
| 1,444,359 | Rand | Feb. 6, 1923 |
| 1,710,779 | Mabee | Apr. 30, 1929 |
| 2,138,285 | Spiegl | Nov. 29, 1938 |
| 2,315,013 | Pecker et al. | Mar. 30, 1943 |
| 2,563,583 | Cox | Aug. 7, 1951 |